(12) United States Patent
Bandholz et al.

(10) Patent No.: US 8,032,745 B2
(45) Date of Patent: Oct. 4, 2011

(54) AUTHENTICATION OF I²C BUS TRANSACTIONS

(75) Inventors: Justin Potok Bandholz, Cary, NC (US);
Ralph M. Begun, Raleigh, NC (US);
Andrew S. Heinzmann, Apea, NC (US);
Fernando A. Lopez, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1687 days.

(21) Appl. No.: 11/312,019

(22) Filed: Dec. 20, 2005

(65) Prior Publication Data
US 2007/0143606 A1 Jun. 21, 2007

(51) Int. Cl.
*H04L 29/06* (2006.01)
(52) U.S. Cl. .................................................. 713/164
(58) Field of Classification Search .................. 713/163, 713/164
See application file for complete search history.

(56) References Cited

U.S. PATENT DOCUMENTS

| | | | | |
|---|---|---|---|---|
| 4,085,448 A * | 4/1978 | Kogge | | 710/107 |
| 4,991,085 A | 2/1991 | Pleva et al. | | 364/200 |
| 5,206,948 A * | 4/1993 | De Angelis et al. | | 714/45 |
| 5,210,862 A * | 5/1993 | DeAngelis et al. | | 714/45 |
| 5,644,636 A | 7/1997 | Fernandez | | 380/4 |
| 5,815,647 A | 9/1998 | Buckland et al. | | 395/182.01 |
| 5,996,034 A * | 11/1999 | Carter | | 710/100 |
| 6,055,660 A | 4/2000 | Meaney | | 714/732 |
| 6,233,635 B1 * | 5/2001 | Son | | 710/315 |
| 6,237,112 B1 | 5/2001 | Yoo et al. | | 714/30 |
| 6,397,315 B1 | 5/2002 | Rahman et al. | | 711/169 |
| 6,574,758 B1 | 6/2003 | Eccles | | 714/712 |
| 6,684,266 B2 | 1/2004 | Faber et al. | | 710/20 |
| 6,957,312 B1 * | 10/2005 | Chou et al. | | 711/163 |
| 7,107,464 B2 * | 9/2006 | Shapira et al. | | 726/15 |
| 2002/0147920 A1 * | 10/2002 | Mauro | | 713/200 |
| 2005/0111420 A1 * | 5/2005 | Fujii | | 370/338 |
| 2005/0204155 A1 * | 9/2005 | Ravi et al. | | 713/200 |
| 2005/0273592 A1 | 12/2005 | Pryor et al. | | |
| 2006/0063594 A1 * | 3/2006 | Benbrahim | | 463/42 |
| 2006/0107054 A1 * | 5/2006 | Young | | 713/176 |

FOREIGN PATENT DOCUMENTS

| | | |
|---|---|---|
| CN | 1474273 A | 2/2004 |
| CN | 1700634 A | 11/2005 |
| WO | WO 03/060841 | 7/2003 |

OTHER PUBLICATIONS

Fischer, R., "Using the PICmicro® MSSP Module for Master I²C™ Communications," *Microchip Technology Inc.*, pp. 1-3 (2000).

* cited by examiner

*Primary Examiner* — Nasser Moazzami
*Assistant Examiner* — Michael S McNally
(74) *Attorney, Agent, or Firm* — H. Barrett Spraggins; Cynthia G. Seal; Biggers & Ohanian, LLP

(57) ABSTRACT

This invention enables authenticated communications (transactions) to take place on a standard I²C bus without requiring modification of existing I²C devices. Read and write transactions occurring on the bus are authenticated using an Authentication Agent and a shared secret key. In addition to allowing verification of the legitimacy of the transactions, the authentication of the I²C transactions enhances the reliability and serviceability of the bus and devices on the bus by allowing the Baseboard Management Controller (BMC) to quickly determine and pinpoint errors.

13 Claims, 4 Drawing Sheets

AUTHENTICATION OF I²C BUS TRANSACTIONS

BACKGROUND OF THE INVENTION

1. Field of the Invention

This invention relates generally to the field of communications occurring on an I²C bus.

2. Background of the Related Art

An inter-IC bus, commonly called an IIC or I²C bus, is a control bus that provides a communication link between integrated circuits in a system. Currently there is no standard way to secure an I²C communications channel and thus, like all unsecured systems, systems employing I²C communications are vulnerable to attack and tampering. As an example, a somewhat sophisticated attacker could surreptitiously open up a machine employing an I²C bus, such as a server, and install a commonly-available I²C writer tool on the I²C bus. The I²C writer tool allows the traffic on the bus to be monitored, or "snooped" as such monitoring is often called in the computer security field. This would allow the attacker to determine how the resources on the bus are being enabled or disabled. Armed with this information, legitimate transactions occurring on the I²C bus could be replicated (and thus appear as legitimate transactions themselves) by the attacker.

One reason that an I²C bus can be attacked so easily is that it is a well-defined open bus and multiple masters can legitimately reside on the bus and co-exist peacefully. In a multiple-master environment of the prior art, each master will be aware that transactions initiated by others are taking place on the bus, but they are unable to determine if these other transactions are legitimate transactions or "rogue" transactions initiated by an intruder. In a single-master environment, the master could be programmed to detect any other transactions occurring (i.e., transactions not initiated by the single master) and operate on the assumption that such transactions are rogue, however, a sophisticated attacker could modify a transaction initiated by the master and such modifications could go undetected. Thus, an attacker can essentially communicate on the I²C bus transparently. This allows rogue masters to enter the bus, communicate with devices on the bus, and change and/or read data that are on those devices without the overall system knowing that those events have happened.

Accordingly, it would be desirable to have the capability to authenticate communications occurring on an I²C bus to assure that the communications are legitimate.

SUMMARY OF THE INVENTION

The present invention enables authenticated communications (transactions) to take place on a standard I²C bus without requiring modification of existing I²C devices. Read and write transactions occurring on the bus are authenticated using an Authentication Agent and a shared secret key. In addition to allowing verification of the legitimacy of the transactions, the authentication of the I²C transactions enhances the reliability and serviceability of the bus and devices on the bus by allowing the Baseboard Management Controller (BMC) to quickly determine and pinpoint errors.

In a preferred embodiment, a secret key is shared between the BMC and the Authentication Agent. The BMC and Authentication Agent separately perform a cryptographic hash on the data that is transmitted on the bus, and the hash value created by the BMC is compared with the hash value created for the same transaction data by the Authentication Agent. A match indicates an authentic, error-free transaction; a mis-match indicates an illegitimate or error in the transaction. The use of the secret key prevents an attacker from falsely authenticating a transaction on the bus.

DETAILED DESCRIPTION OF THE PREFERRED EMBODIMENTS

Figure 1:
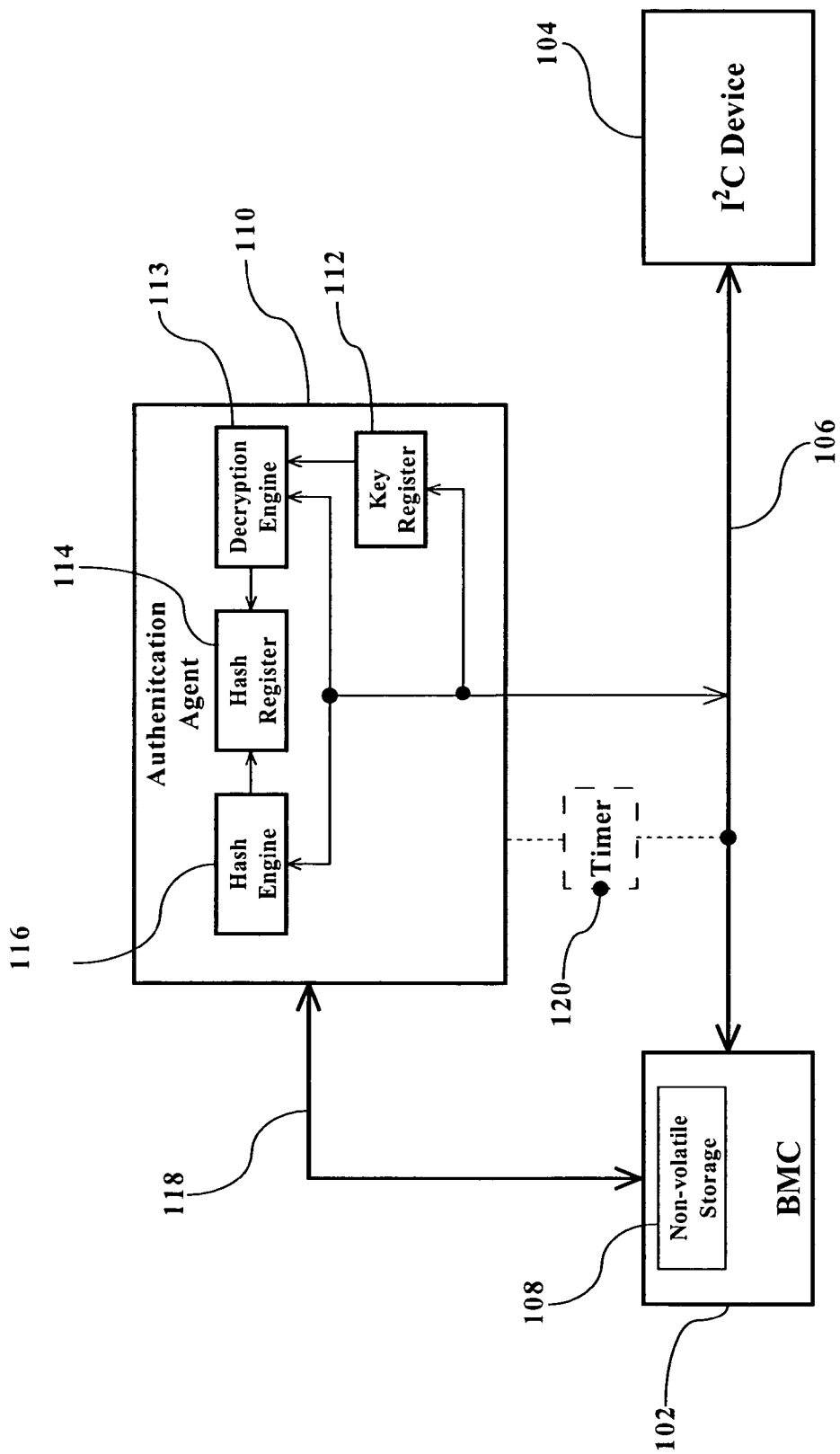
FIG. 1 is a block diagram illustrating the basic architecture of the present invention.

FIG. 1 is a block diagram illustrating the basic architecture of the present invention. Referring to FIG. 1, an I²C master, e.g., BMC 102, is coupled to an I²C device 104 via an I²C bus 106. These elements comprise the typical architecture for an I²C system. Although only a single I²C device is shown, multiple I²C devices typically reside on the same I²C bus.

In accordance with the present invention, an Authentication Agent 110 is coupled to the I²C bus 106 so that it is in communication with all of the devices communicating over the I²C bus 106. In its most basic form, Authentication Agent 110 comprises a key register 112, a decryption engine 113, a hash register 114, and a hash engine 116. Authentication agent 110 can communicate with all devices on the I²C bus and is addressable itself so that other devices on the I²C bus can communicate with it.

In the embodiment illustrated in FIG. 1, the BMC 102 includes a general purpose CPU (not shown), e.g., a microcomputer with multiple I/O channels, including an I²C controller, and non-volatile storage 108, both within the same BMC. In a preferred embodiment, the CPU should be capable of implementing a shared key cryptographic hash algorithm (e.g., for a shared system, a cryptographic hash followed by encrypting the hash using a symmetric cipher using the stored secret key; for a public key system, a cryptographic hash followed by encrypting the hash using a public key cipher using the stored secret key) or the BMC should contain special purpose hardware (e.g., dedicated logic to perform the hash and dedicated logic to perform the encryption) to perform these tasks. Cryptographic hashing techniques are well known in the art, and any known hashing techniques and/or architecture can be used in the present invention. An error signal bus 118 connects BMC 102 and Authentication Agent 110 for the purpose of signaling error detection by the Authentication Agent 110.

The Authentication Agent 110 resides on the I²C bus 106 and detects and monitors all I²C transactions that occur on the bus. A feature of the I²C protocol, referred to as a "repeated start condition," is utilized in connection with the present invention. The repeated start condition allows a bus master, e.g., BMC 102 to continually initiate new transactions without re-arbitrating for control of the bus. Thus, the bus master can issue new transactions with the same data as many times as desired while maintaining bus control.

Using a standard start condition, the I²C Master initiates the transaction with the I²C device over the I²C bus, and at the end of the transaction to this particular I²C device, instead of generating a stop condition, which terminates the transaction, it issues a repeated start condition, and instead of addressing the target device with the repeated transmission it initiates a write transaction to the Authentication Agent residing on the I²C bus over which the transaction is taking place. By using the repeated start condition, instead of having two separate bus transactions, a single continuous repeated transaction occurs. Repeated start transactions are used to ensure the proper grouping of data and hash values in a multi-master environment. If repeated start transactions are not used, it may be possible for a competing master to win I²C arbitration during the hash write stage, thus corrupting the verification process.

The use of repeated start transactions does not preclude the use of a repeated start transaction to access I²C devices (such as I²C NVRAMs). If the Authentication Agent is not the target of the transaction following a repeated start transaction, the Authentication Agent will continue to snoop the bus and use the additional address and data to continue calculating the hash. The Authentication Agent should treat repeated start transactions that mix reads and writes the same as transactions that simply do reads or writes. The BMC of the present invention is configured to correctly hash these repeated start read/write transactions.

Since the Authentication Agent snoops the entire transaction occurring on the bus (e.g., it receives the identical data transmitted to the I²C device from the master), it can create a hash value based on the same information, using hash engine 116. Since the BMC is the device that, assuming the transmission was legitimate, created all of that information, it too can create a hash based on that information. The BMC then encrypts the hash using its secret key and transmits the encrypted hash to the Authentication Agent. The Authentication Agent then decrypts the hash using decryption engine 113 and the hash register is configured to compare the two hash values (i.e., the hash value created by the Authentication Agent is compared with the hash value received from the BMC) using known comparison methods, e.g., two-input logic gates that issue a first digital value if the two inputs are the same and a second digital value if the two inputs are not the same. If the hash value calculated by the Authentication Agent differs from the hash value calculated by the BMC, it is known that either a rogue device initiated the transmission or there was an error in the transmission. In either case, this is valuable information to know. The Authentication Agent then signals the error via the error channel 118. The BMC can then take appropriate action, that is, to resend the transmission or determine where the security breach occurred. If a read or write transaction occurs on a bus (and is thus snooped by the Authentication Agent monitoring the bus) and the Authentication Agent does not receive the hash value that is calculated by the BMC for the transaction, the Authentication Agent signals to the BMC, via error channel 118, that an error has occurred.

The Authentication Agent and BMC should use only the information contained in each byte transfer to calculate the hash. START, STOP, and ACK/NACK bits should not be used in calculation of the hash. Additionally, the Authentication Agent should not include the hash transmission transaction in its hash calculation.

The same hash algorithm is used by both the BMC and the Authentication Agent. The BMC and Authentication Agent may alternatively employ public key cryptography to encrypt and decrypt the hashes, or any other known cryptographic technique. To use a public key method, the BMC may create the public-private key pair. The public key can be transmitted to the key register in the Authentication Agent and the BMC retains the private key. After the BMC computes the hash for a transaction, it uses its private key to encrypt the hash. The Authentication Agent then uses the BMC's public key to decrypt the hash.

The above-described embodiment provides a system for allowing transactions occurring on an I²C bus to be authenticated, a significant improvement over systems of the prior art. However, a sophisticated attacker could disconnect Authentication Agent 110 from the I²C bus 106 in an attempt to bypass the tampering detection it provides. In accordance with a preferred embodiment of the present invention, the system of FIG. 1 can be configured additionally with a "watchdog" timer 120 that is coupled between the I²C bus 106 and the Authentication Agent 110 (timer 120 is shown using dotted lines to indicate that it is optional). The timer 120 is configured to cause the Authentication Agent 110 to indicate an error to the BMC 102 over error channel 118 in the event that the Authentication Agent 110 does not receive an I²C transaction within a predetermined time frame. For example, if a pause is detected by the timer that is greater than the length of a single valid transaction length, the system can be configured to indicate a problem.

A sophisticated attacker could also disconnect or spoof the error channel 118 between the BMC 102 and the Authentication Agent 110. To combat this type of attack, in a preferred embodiment, the BMC 102 is configured to periodically address and transmit random data to the Authentication Agent 110. The Authentication Agent 110 is configured to accept this random data and perform no action on it. The BMC 102 will then calculate and encrypt the hash and transmit it to the Authentication Agent in the normal fashion, but periodically the BMC 102 will deliberately corrupt the hash value before transmission. The Authentication Agent 110 will decrypt the potentially corrupted hash and compare it as it normally would, and signal an error on the error channel 118 as appropriate. Since the BMC 102 "knows" that hash it created is correct or incorrect, it will expect an appropriate error response on the error channel 118. Since, in this attack scenario, the error channel 118 between the Authentication Agent 110 and BMC 102 has been disconnected or spoofed, no such error signal, or an incorrect error signal, will be received by the BMC, and the BMC will assume the occurrence of a problem and take corrective action.

Figure 2:
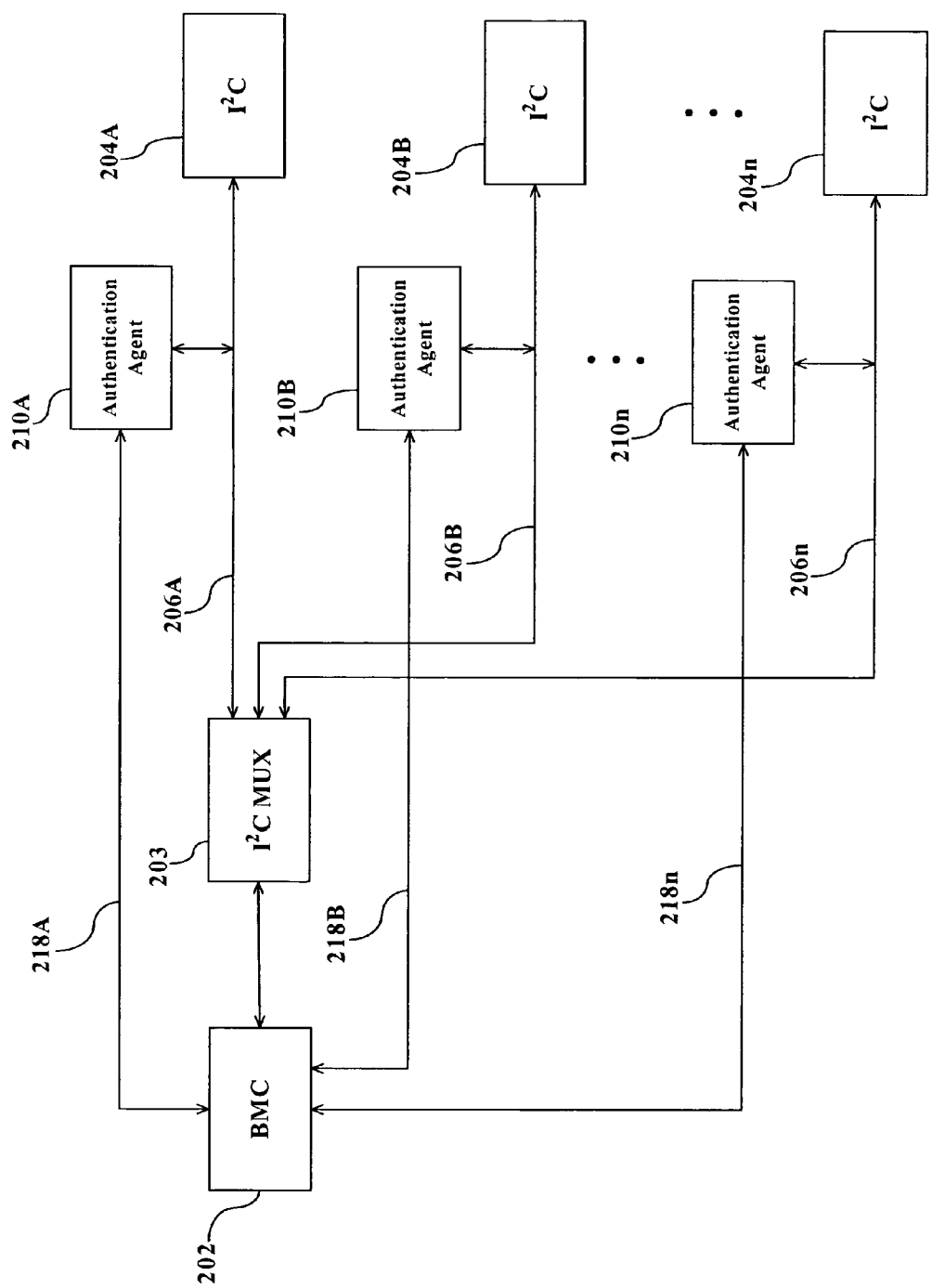
FIG. 2 illustrates the use of an I²C mux to enable the splitting of a single I²C bus into multiple I²C busses.

FIG. 2 illustrates the use of an I²C mux 203 to enable the splitting of a single I²C bus into multiple I²C busses. In this configuration, multiple Authentication Agents 210A, 210B, . . . 210n are connected to an I²C bus, one for each of the I²C busses 206A, 206B, . . . 206n that are split off of the I²C mux 203. Each Authentication Agent must have a communication path (218A, 218B, . . . 218n) established between it and the BMC so that error messages can be transmitted. Further, each Authentication Agent must have a tap off of its associated I²C bus so that it may snoop on the I²C bus and receive the data for hashing. The operation of each path of the I²C busses 206A, 206B, . . . 206n emanating from I²C mux 203 is essentially identical to that described above with respect to FIG. 1. Although not shown in FIG. 2, timers as shown in FIG. 1 can be included for each Authentication Agent if desired.

Figure 3:
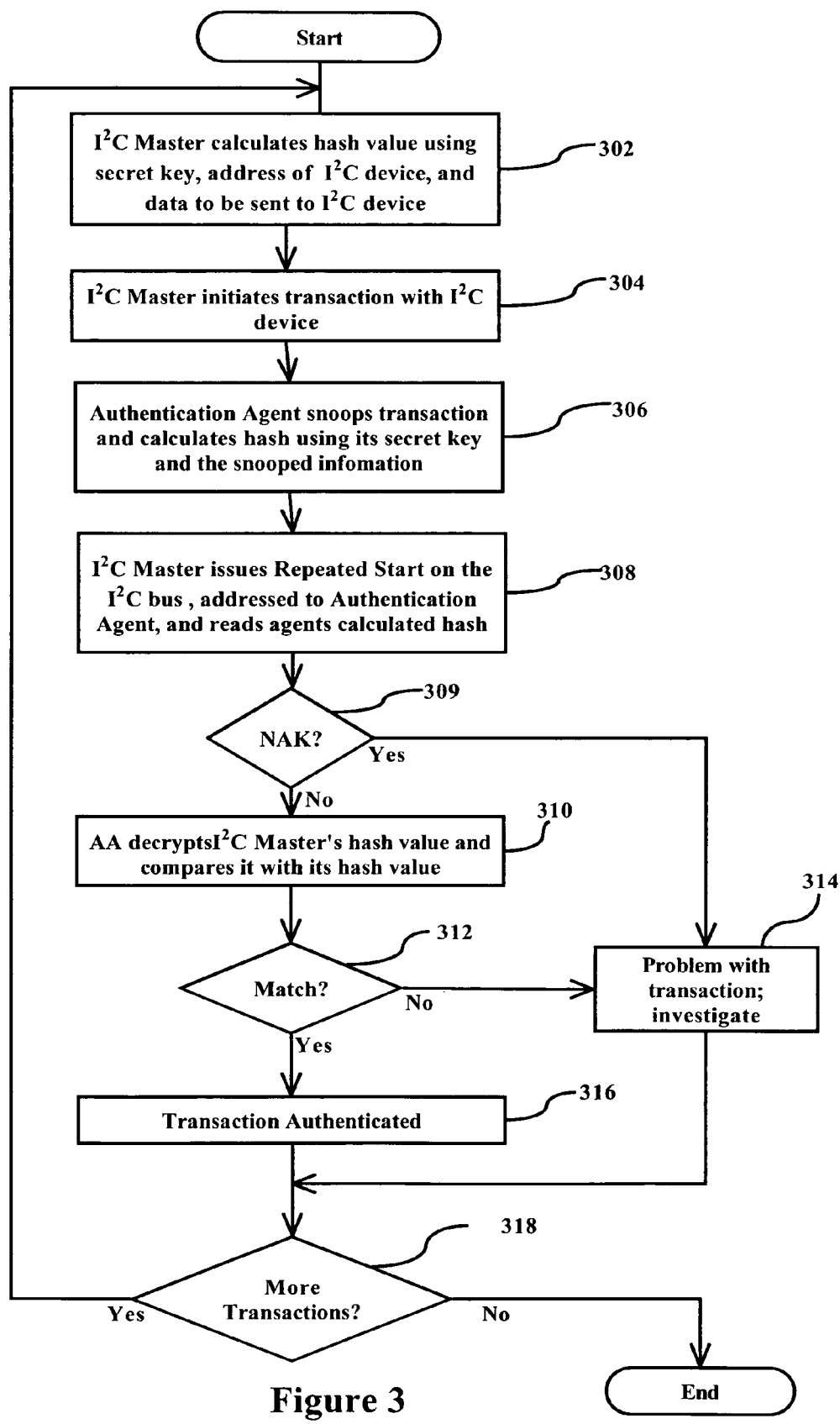
FIG. 3 is a flowchart illustrating generally steps performed in a write transaction in accordance with the present invention.

FIG. 3 is a flowchart illustrating generally steps performed in a write transaction in accordance with the present invention. The process begins, and at step 302, the I²C Master calculates a hash value using its secret key (for HMAC authentication), the address of a target I²C device, and the data to be sent to the target I²C device. The I²C master then encrypts the hash with its secret key. At step 304, the I²C Master initiates the write transaction with the target I²C device.

At step 306, the Authentication Agent snoops the transaction and calculates a hash value using its secret key and the transaction information (address plus data). At step 308, I²C Master issues a repeated start transaction on the I²C bus, addressed to the Authentication Agent, and writes the I²C's master's calculated hash created in step 302. If the I²C master receives a negative acknowledgment code (NAK) when addressing and communicating with the Authentication Agent (step 309), it should proceed to step 314 for error determination. If no NAK is received, at step 310 the Authentication Agent decrypts the I²C Master's hash value with its key and compares it with the hash value it created.

At step 312, if it is determined that the hash values do not match or if no hash was received by the Authentication Agent before the transaction was terminated with a STOP command, the process proceeds to step 314, where the transaction is deemed to be problematic, and an investigation is initiated. If the investigation indicates the existence of a simple error, the transaction may be resent. If the investigation indicates a possible security breach, measures can be taken to remedy the breach. A simple error may be indicated by the BMC completing the full transaction and receiving an error via the error channel. A security breach may be indicated by the BMC receiving an error via the error channel without it having issued an associated transaction. The process then proceeds directly to step 318, described below.

If at step 312 it is determined that the hash values do match, the transaction is authenticated at step 316 and no remedial action is required. The process then proceeds to step 318, where a determination is made as to whether or not there are additional transactions being issued on the bus. If there are, the process proceeds back to step 302; if there are not, the process ends.

Figure 4:
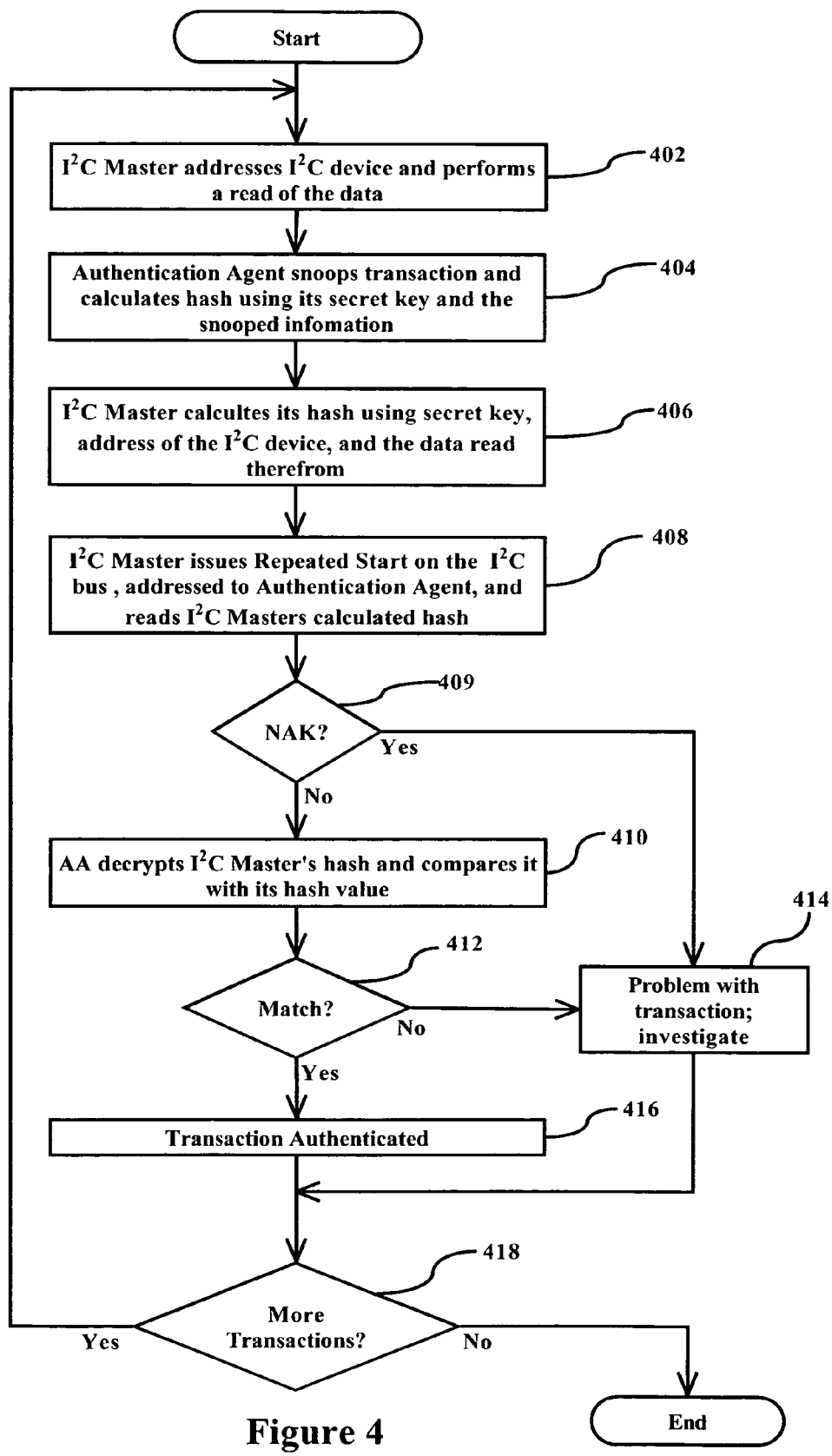
FIG. 4 is a flowchart illustrating generally steps performed in a read transaction in accordance with the present invention.

FIG. 4 is a flowchart illustrating generally steps performed in a read transaction in accordance with the present invention. The process begins, and at step 402, the I²C Master addresses the target I²C device and performs a read of the data from the target I²C device. At step 404, the Authentication Agent snoops the read transaction and calculates a hash value using its secret key (or if "hash+encrypt" authentication is being used, the Authentication Agent can perform the hash operation) and the snooped information. At step 406, the I²C Master calculates its hash using its secret key, the address of the I²C device from which the data was read, and the data read therefrom. The I²C Master then encrypts the hash using its key. At step 408, the I²C Master issues a repeated start transaction on the I²C bus, addressed to the Authentication Agent, and writes the I²C Master's calculated hash. If the I²C master receives a NAK when addressing and communicating with the Authentication Agent (step 409), it should proceed to step 414 for error determination.

If no NAK is received by the I²C master at step 409, at step 410, the Authentication Agent decrypts the I²C master's hash and compares the result with its calculated hash value. If, at step 412, it is determined that no match exists or if no hash was received by the Authentication Agent before the transaction was terminated with a STOP command, it is concluded that there is a problem with the transaction and an investigation of the problem is initiated (step 414). If, at step 412, it is determined that there is a match, the transaction is authenticated (step 416).

At step 418, it is determined if there are any additional transactions to be transmitted. If there are additional transactions, the process proceeds back to step 402. If there are no additional transactions, the process ends.

In a preferred embodiment, the Authentication Agent of the present invention can comprise a micro-controller containing a shared key decryption engine, a cryptographic hash engine, a hash register, and a write-once non-volatile key register. A CPLD, ASIC, or FPGA could be used instead of a micro-controller if desired. The write-once register is used as the key for the decryption engine, and is not readable. Optionally the device could implement a clear pin or register bit that would clear the contents of the key register. The hash engine uses the shared key (for HMAC authentication) and data from the I²C bus to generate a hash value. The hash value is stored in the hash register. If an I²C mux sits between the BMC and the I²C slave as shown in FIG. 2, the Authentication Agent must reside on the same I²C bus as the device to be protected. This will prevent unauthorized transactions to the slave devices.

Preferably, the cryptographic hash algorithm should use a secret key to ensure that the hash output cannot be easily recreated by inspection of the I²C data alone, i.e., HMAC authentication.

Prior to operation, an initialization process should be performed to set the system up for operation. The system should be initialized in a physically secure environment since the BMC will be transmitting keys in plain text over the I²C bus. In an exemplary initialization process, the BMC first receives a command to initialize the Authentication Agents. Included in this command is the shared secret key to be used for all communications. The BMC stores this key in its non-volatile storage. The BMC then proceeds to write this key to the write-once registers of all the attached Authentication Agents. The BMC then validates that all the Authentication Agents keys have been written properly by performing at least one authenticated transaction to an I²C device on each bus (as described above with respect to FIGS. 3 and 4). If an error is detected during the authentication, the Authentication Agent's key is cleared and reprogrammed. After all the Authentication Agents have been verified, then the system is ready for normal operation.

As an alternative, the BMC code and Authentication Agents could have the secret key embedded in their designs. This would eliminate the Initialization procedure. However, care would have to be taken to make sure that the key is not recoverable from code updates, using any known manner.

The above-described steps can be implemented in hardware and/or using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of the BMC. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A system for authenticating transactions between an I2C master and one or more I2C devices over at least one I2C bus, comprising:
    an authentication agent coupled to a first I2C bus, said authentication agent comprising a module of computer hardware and software configured to monitor all transactions occurring on said first I2C bus, identify transactions that fail authentication, and signal the identification of said transactions that fail authentication to said I2C master.

2. The system of claim 1, wherein said authentication agent comprises:
    a hash engine coupled to said first I2C bus, said hash engine performing a cryptographic hash on each transaction occurring on said first I2C bus to create an authentication hash value for each transaction; and
    a hash register coupled to said first I2C bus and said hash engine, said hash register comparing each said authentication hash value with a validation hash value created by the I2C master for each transaction on said first I2C bus that it initiated, whereby the results of said comparison are used by said authentication agent to determine whether a particular one of said transactions monitored by said authentication agent fails authentication.

3. The system of claim 2, wherein said authentication agent further comprises:
    a key register coupled to said first I2C bus and storing a cryptographic key received from said I2C master; and
    a decryption engine coupled to said key register and to said hash register, said decryption engine using said cryptographic key stored in said key register to decrypt each transaction received from said first I2C bus.

4. The system of claim 3, further comprising:
    a timer coupled to said authentication agent and said first I2C bus, said timer configured to send a time-out signal to said authorization agent when a predetermined time has elapsed with no transactions occurring on said first I2C bus, whereby said authentication agent is configured to send a time-out event-signal to said I2C master upon receipt of said time-out signal from said timer.

5. The system of claim 4, further comprising:
    an I2C multiplexer coupled between said I2C master and each of said I2C buses, wherein each of said I2C buses has a dedicated authentication agent coupled thereto.

6. A computer program product for authenticating transactions between a baseboard management controller (BMC) and one or more I2C devices over at least one I2C bus, the computer program product comprising a non-transitory computer-readable storage medium having computer-readable program code embodied in the medium, the computer-readable program code comprising:
    computer-readable program code that is configured to monitor all transactions occurring on said first I2C bus, identify transactions that fail authentication, and signal the identification of said transactions that fail authentication to said BMC.

7. The computer program product of claim 6, further comprising:
    computer-readable program code that performs a cryptographic hash on each transaction occurring on said first I2C bus to create an authentication hash value for each transaction; and
    computer-readable program code that compares each said authentication hash value with a validation hash value created by the BMC for each transaction on said first I2C bus that it initiated, whereby the results of said comparison are used to determine whether a particular one of said monitored transactions fails authentication.

8. The computer program product of claim 7, further comprising:
    computer-readable program code that stores a cryptographic key received from said BMC; and
    computer-readable program code that uses said cryptographic key stored in said key register to decrypt each transaction received from said first I2C bus.

9. The computer program product of claim 8, further comprising:
    computer-readable program code that is configured to create a time-out signal when a predetermined time has elapsed with no transactions occurring on said first I2C bus; and
    computer-readable program code that is configured to send a time-out event-signal to said BMC upon receipt of said time-out signal.

10. A method for authenticating transactions between a baseboard management controller (BMC) and one or more I2C devices over at least one I2C bus, the method comprising:
    monitoring, by an authentication agent comprising a module of automated computing machinery, all transactions occurring on said first I2C bus;
    identifying, by the authentication agent, transactions that fail authentication; and
    signaling, by the authentication agent, the identification of said transactions that fail authentication to said BMC.

11. The method of claim 10, further comprising:
    performing a cryptographic hash on each transaction occurring on said first I2C bus to create an authentication hash value for each transaction; and
    comparing each said authentication hash value with a validation hash value created by the BMC for each transaction on said first I2C bus that it initiated, whereby the results of said comparison are used to determine whether a particular one of said monitored transactions fails authentication.

12. The method of claim 11, further comprising:
    storing, in a key register, a cryptographic key received from said BMC; and
    using said cryptographic key stored in said key register to decrypt each transaction received from said first I2C bus.

13. The method of claim 12, further comprising:
    issuing a time-out signal when a predetermined time has elapsed with no transactions occurring on said first I2C bus; and
    sending a time-out event-signal to said BMC upon issuance of said time-out signal.

* * * * *